(No Model.)
H. & F. W. LUTTS.
MACHINE FOR FILING SAW TEETH.
No. 299,560. Patented June 3, 1884.
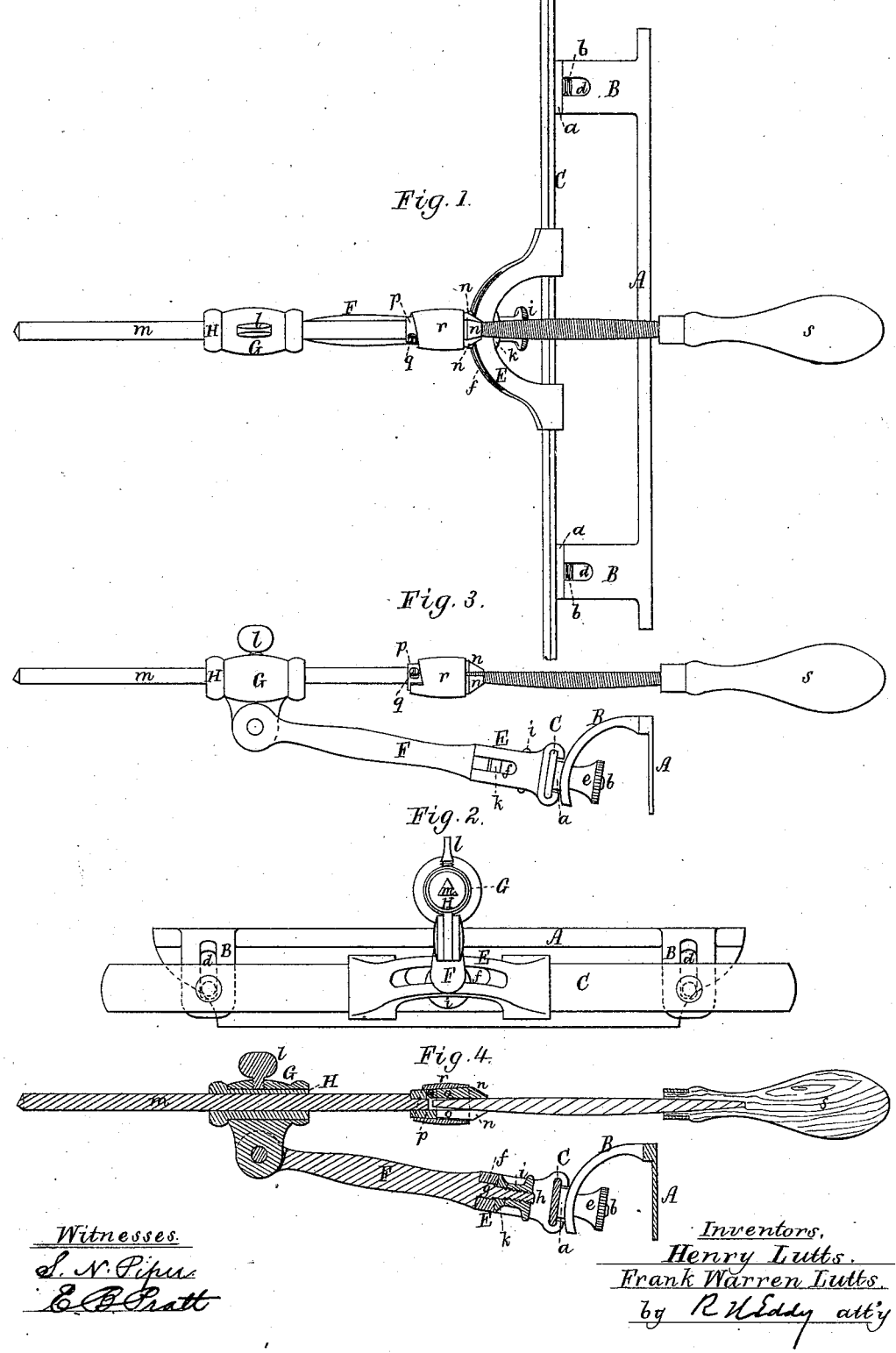
Witnesses:
S. N. Piper
E. B. Pratt
Inventors,
Henry Lutts.
Frank Warren Lutts.
by R. H. Eddy att'y

UNITED STATES PATENT OFFICE.

HENRY LUTTS AND FRANK WARREN LUTTS, OF MALDEN, MASSACHUSETTS.

MACHINE FOR FILING SAW-TEETH.

SPECIFICATION forming part of Letters Patent No. 299,560, dated June 3, 1884.

Application filed August 7, 1883. (No model.)

*To all whom it may concern:*

Be it known that we, HENRY LUTTS and FRANK WARREN LUTTS, of Malden, in the county of Middlesex, of the Commonwealth of Massachusetts, have invented a new and useful Improvement in Machinery for Filing the Teeth of Saws; and we do hereby declare the same to be described in the following specification and represented in the accompanying drawings, of which—

Figure 1 is a top view, Fig. 2 a front elevation, Fig. 3 an end view, and Fig. 4 a transverse section, of mechanism embodying our invention, the nature of which is defined in the claim hereinafter set forth.

The machine is to properly adjust a file to a saw and to support and guide such file while it may be in the act of being moved by a person for reducing or sharpening a tooth of such saw.

In the drawings, A denotes a plate, provided with two curved and slotted projections, B, formed and extending from it in manner as represented. Against the outer curved surfaces of the said projections are arranged the two bearings $a\ a$ of a straight bar, C, there projecting from each of the said bearings a screw, $b$. These screws go through the slots $d$ of the projections B, and are provided with nuts $e$, arranged on them in rear of the said projections. By the means as described for adapting the bar C to the plate A, such bar can be adjusted to vary its inclination, and can be clamped in position relatively to such plate.

An arch, E, slotted lengthwise, is at its extremities adapted to embrace and slide on the bar C longitudinally thereof. An arm, F, projecting from the arch in manner as shown, is movable in the slot $f$ thereof, so as to be capable of being adjusted in various radial directions, such bar being provided with a shoulder, $g$, a clamp-screw, $h$, nut $i$, and collar $k$, arranged on it and with respect to the arch in manner as shown. By means of such appliances the arm in any of its radial positions may be clamped to the arch. Hinged to the arm at its outer end, as represented, is a tubular box, G, the connection of the two being such as to enable the box to be revoluble only in a vertical plane through the axis of the arm.

Within the bore of the box, so as to be capable of revolving therein, is a sleeve, H, whose bore is in transverse section an equilateral triangle. There is screwed down into the box G at its middle and against the said sleeve a set-screw, $l$. Extending through the said bore of the said revoluble sleeve is a prismatic bar, $m$, whose transverse section corresponds to that of the bore.

The bar $m$ is provided with three jaws, $n$, to receive between them at its outer end a file-blade triangular in cross-section, as those of files for sharpening saw-teeth usually are. The shanks $o$ of the jaws are tapering and pivoted to a collar, $p$, held to the bar $m$ by a set-screw, $q$.

A sleeve or tube, $r$, having a tapering bore, encompasses and turns freely on the said shanks, and has its outer end spiral or inclined, as shown, and bearing against the head of the said screw $q$. On revolving the sleeve on the shanks it will be forced lengthwise on them, so as to cause the jaws to clamp the file in connection with the bar $m$. By taking hold of the handle $s$ of the file and moving it forward and backward longitudinally, the bar $m$ will be correspondingly moved in the sleeve, and the latter will guide the bar in its reciprocating rectilinear movements.

From the above it will be seen that the file holder or mechanism, as hereinbefore described, enables a file to be adjusted to different angles both vertically and horizontally relatively to the plate A, in order that the file, when in movement for filing the tooth of a saw, may do so at the desirable bevel or inclination thereto, and this at either edge of the tooth. The mechanism admits of the file being adjusted or moved from tooth to tooth of the saw, each of which will be beveled alike by the file in operating upon it. On the file becoming worn at one edge or side, the prismatic bar, with the file attached to it, can be withdrawn from the sleeve and turned and restored to place, so as to bring another edge or side of the file into operation.

In using the filing-machine, the plate A, with the saw-blade resting against its rear face and extending a little above it, is to be clamped in a vise or between the jaws thereof.

We claim—

The file supporting, adjusting, and guiding machine, substantially as described, consisting of the bar A, slotted and curved projections B B, bar C, sliding and slotted arch E, arm F, pivoted box G, prismatic bored sleeve H, the bar *m*, and the clamping devices of such bar C, arm F, box G, and bar *m*, all adapted and arranged essentially in manner to operate as set forth.

HENRY LUTTS.
FRANK WARREN LUTTS.

Witnesses:
R. H. EDDY,
E. B. PRATT.